May 22, 1945. H. M. MARTIN 2,376,441
DYNAMOELECTRIC MACHINE
Filed Sept. 29, 1943

Inventor:
Harold M. Martin,
by Harry E. Dunham.
His Attorney.

Patented May 22, 1945

2,376,441

UNITED STATES PATENT OFFICE 2,376,441

DYNAMOELECTRIC MACHINE

Harold M. Martin, Schenectady, N. Y., assignor to General Electric Company, a corporation of New York Application September 29, 1943, Serial No. 504,271

5 Claims. (Cl. 171—252)

My invention relates to dynamoelectric machines and particularly to a cooling arrangement for inductor dynamometers.

An object of my invention is to provide an improved dynamoelectric machine adapted to be cooled by cooling liquid which flows in direct contact with a surface of the machine.

Another object of my invention is to provide an improved dynamoelectric machine having two relatively rotatable members, one of which has a smooth surface, and the other of which has a toothed surface and which is provided with an arrangement for directing cooling liquid substantially only into the space between the smooth surface and the adjacent faces of the teeth of the toothed member.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
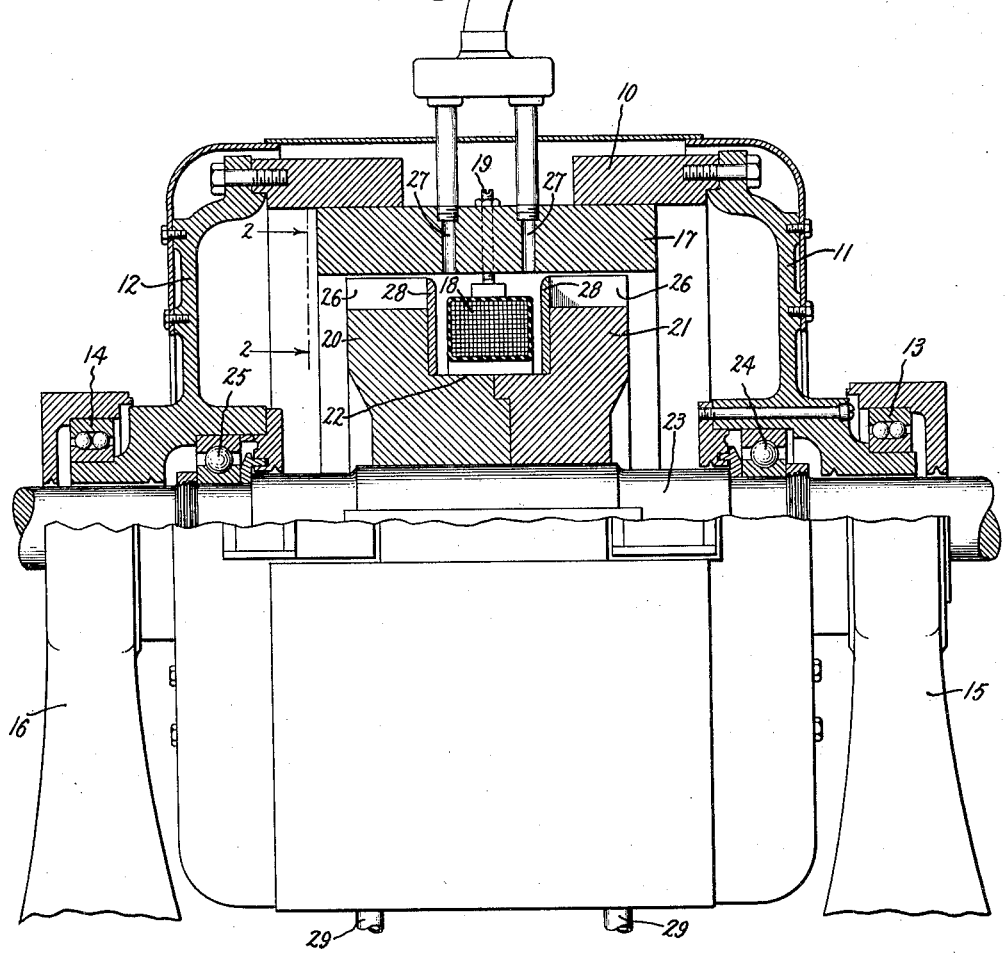
Figure 2:
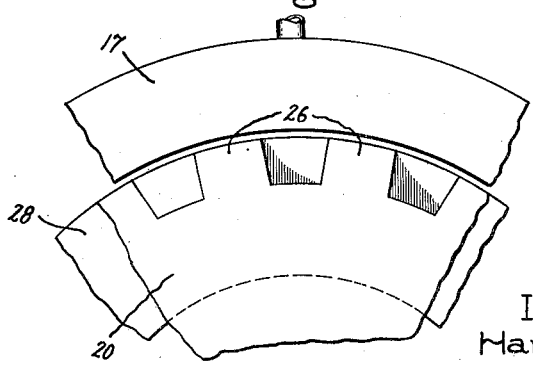

In the drawing, Fig. 1 is a side elevational view, partly in section, illustrating an embodiment of my invention; and Fig. 2 is a partial end view taken along line 2—2 of Fig. 1.

Referring to the drawing, I have shown my invention as applied to a dynamoelectric machine of the inductor eddy current dynamometer type. In this construction, two relatively rotatable members are provided, which include a relatively stationary member 10 which is provided with end shields 11 and 12 supported by bearings 13 and 14 in bearing pedestals 15 and 16 and is adapted to rotate through a limited arc to transfer the torque reaction of this member to a suitable force measuring device. This stationary member is provided with an eddy current ring 17 of magnetic material which is adapted to be excited by an annular exciting winding 18 supported within the member 17 by a plurality of supporting set screws 19. A relatively rotatable member is arranged within the eddy current. member 17 and is formed with two axially spaced apart toothed sections 20 and 21 with an intermediate part 22 of reduced diameter of sections 20 and 21. This rotatable member also is made of magnetic material and is mounted on a shaft 23 which is supported by bearings 24 and 25 within the end shields 11 and 12 respectively. The exciting winding 18 is adapted to provide magnetic excitation having a path which extends through the member 17, through the air gap between the member 17 and one toothed section 20 or 21, through the respective section 20 or 21, through the rotatable member section 22 of reduced diameter, through the other toothed section 21 or 20, and across its corresponding air gap back to the member 17.

The shaft 23 is adapted to be coupled in any suitable manner to a driving power source which is to be tested, and rotation of the shaft 23 causes rotation of the rotatable member such that teeth 26 induce eddy currents in the member 17. This member 17 is provided with a relatively smooth surface adjacent the outer faces of the teeth such that the air gap between the teeth and the member 17 can be made as small as possible so as to reduce the reluctance of the magnetic circuit and increase the eddy currents induced in the member 17. These eddy currents cause the heating of the member 17 to relatively high temperatures, and it is desirable that this heat should be removed from this member as efficiently and as completely as possible. In order to cool the member 17, a cooling liquid such as water is adapted to be supplied through openings 27 in the member 17 to the space above the intermediate part 22 of the rotatable member, such that the cooling liquid can flow about the exciting winding 18 to cool the same and flow outwardly towards both ends of the machine through the air gap between the smooth surface of the member 17 and the teeth 26 of the rotatable member. It has been found that if this cooling liquid is allowed to pass outwardly through the spaces between the teeth 26 as well as through the two air gaps, considerable turbulence is created in the cooling liquid and a considerable hydraulic load is placed on the rotatable member which tends to vary erratically for different speeds of the rotatable member. In order to eliminate this hydraulic load as much as possible, I provide baffles 28 arranged on the inner side of each of the toothed sections for substantially closing the inner ends of the spaces between the teeth of the toothed member adjacent the cooling liquid supply, and each of these baffles is formed with an end surface which is curved toward the teeth for guiding the cooling liquid into the air gap space between the smooth surface of the member 17 and the faces of the teeth 26 adjacent the smooth surface. In this manner, the cooling liquid is guided into the air gap between the member 17 and the faces of the teeth 26 and tends to remain in intimate contact with the member 17 to provide efficient cooling of this member without flowing downwardly into the spaces between the teeth 25. The lower portion of the machine is provided with outlet passages 29 which are arranged to withdraw cooling liquid from within the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having two relatively rotatable members, one of said members having a relatively smooth surface and the other of said members having a pair of toothed surfaces adjacent said relatively smooth surface, means for supplying cooling liquid between said pair of toothed surfaces and into the air gap between said toothed and smooth surfaces, and means arranged on the inner ends of the teeth of said toothed member having a curved outer end for guiding the cooling liquid into the air gap between said smooth surface and the faces of the teeth of said toothed surfaces adjacent said smooth surface.

2. A dynamoelectric machine having two relatively rotatable members, one of said members having a relatively smooth surface and the other of said members having a pair of toothed surfaces adjacent said relatively smooth surface, means for supplying cooling liquid between said pair of toothed surfaces and into the air gap between said toothed and smooth surfaces, and means for substantially closing the inner ends of the spaces between the teeth of said toothed member and having a curved outer end for guiding the cooling liquid into the air gap between said smooth surface and the faces of the teeth of said toothed surfaces adjacent said smooth surface.

3. A dynamoelectric machine having two relatively rotatable members, one of said members having a relatively smooth surface and the other of said members having a pair of toothed surfaces adjacent said relatively smooth surface, means for supplying liquid between said pair of toothed surfaces for cooling said members by flow of the liquid in the space between said toothed and smooth surfaces, and means including a baffle having a curved outer end surface for substantially closing the ends of the spaces between the teeth of said toothed member adjacent the cooling liquid supply means and for guiding the cooling liquid into the space between said smooth surface and the faces of the teeth adjacent said smooth surface.

4. A dynamoelectric machine having two relatively rotatable members, one of said members having a relatively smooth surface and the other of said members having a pair of toothed sections adjacent said relatively smooth surface with an intermediate section of reduced diameter, means for supplying liquid to said intermediate section for flow outwardly through the spaces between said toothed and smooth surfaces, and means including a baffle arranged on the inner side of each of said toothed sections for substantially closing the inner ends of the spaces between the teeth of said toothed member and having end surfaces curved toward said teeth for guiding the cooling liquid into the space between said smooth surface and the faces of said teeth adjacent said smooth surface.

5. A dynamoelectric machine having two relatively rotatable members, one of said members having a relatively smooth surface and the other of said members having a pair of toothed sections adjacent said relatively smooth surface with an intermediate section of reduced diameter, means for supplying liquid to said intermediate section for flow outwardly through the spaces between said toothed member and smooth surfaces, means including a baffle arranged on the inner side of each of said toothed sections for substantially closing the inner ends of the spaces between the teeth of said toothed member and having an end surface curved toward said teeth for guiding the cooling liquid into the space between said smooth surface and the faces of said teeth adjacent said smooth surface, and means for withdrawing the cooling liquid from within said machine.

HAROLD M. MARTIN.